United States Patent [19]

Williams

[11] 4,321,858
[45] Mar. 30, 1982

[54] CREPE MAKER

[76] Inventor: Donna Williams, 12520 Edgewater Dr., Lakewood, Ohio 44107

[21] Appl. No.: 195,604

[22] Filed: Oct. 9, 1980

[51] Int. Cl.³ .............................. A21B 5/00; A21C 9/00
[52] U.S. Cl. ........................................ 99/353; 99/355; 99/423; 99/443 C; 99/450.6; 99/450.7; 426/497; 426/500
[58] Field of Search ................. 99/450.6, 450.2, 450.7, 99/450.1, 352, 353, 355, 423, 426, 427, 432, 443 K, 386; 426/496, 497, 500, 502, 275, 283

[56] References Cited

U.S. PATENT DOCUMENTS

| | | | |
|---|---|---|---|
| 1,981,875 | 11/1934 | McDonald | 99/450.6 |
| 3,265,016 | 8/1966 | Cheung | 99/450.2 |
| 3,611,950 | 10/1971 | Battaglia | 99/450.6 |
| 3,669,007 | 6/1972 | Pulici | 99/450.6 |
| 3,782,269 | 1/1974 | Latham | 99/427 |
| 3,901,137 | 8/1975 | Jimenez | 99/353 |
| 3,946,656 | 3/1976 | Hai | 99/450.6 |

FOREIGN PATENT DOCUMENTS 2428403  2/1980  France ............................ 99/450.6

Primary Examiner—Billy J. Wilhite
Attorney, Agent, or Firm—Fay & Sharpe

[57] ABSTRACT

An apparatus for preparing a food product having at least a cooked batter outer shell and a filling material contained therein. The apparatus is comprised of an conventionally controlled, motor-driven, continuous conveyor belt mounted on a frame; an oil container and associated wick which oil the surface of the belt; a batter dispenser for dispensing batter to the surface of the belt; heating griddles for cooking the batter; a filling material dispenser for dispensing filling material onto the batter; a plurality of side folding spades for folding over side portions of the batter; a rolling mechanism for rolling the batter and filling material over onto itself; and, controls for controlling the operation of the apparatus. The side folding spades are arcuately configured and tapered from one end to the other end. The rolling mechanism is a power driven roller having an abrasive surface in association with a rolling spade.

5 Claims, 8 Drawing Figures

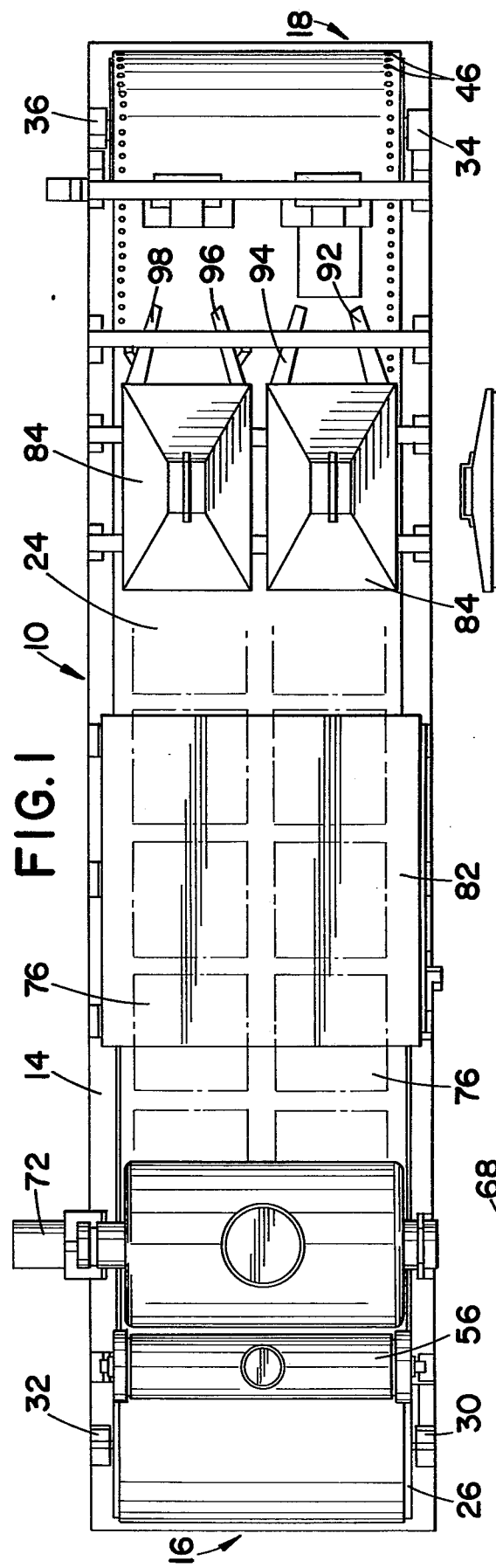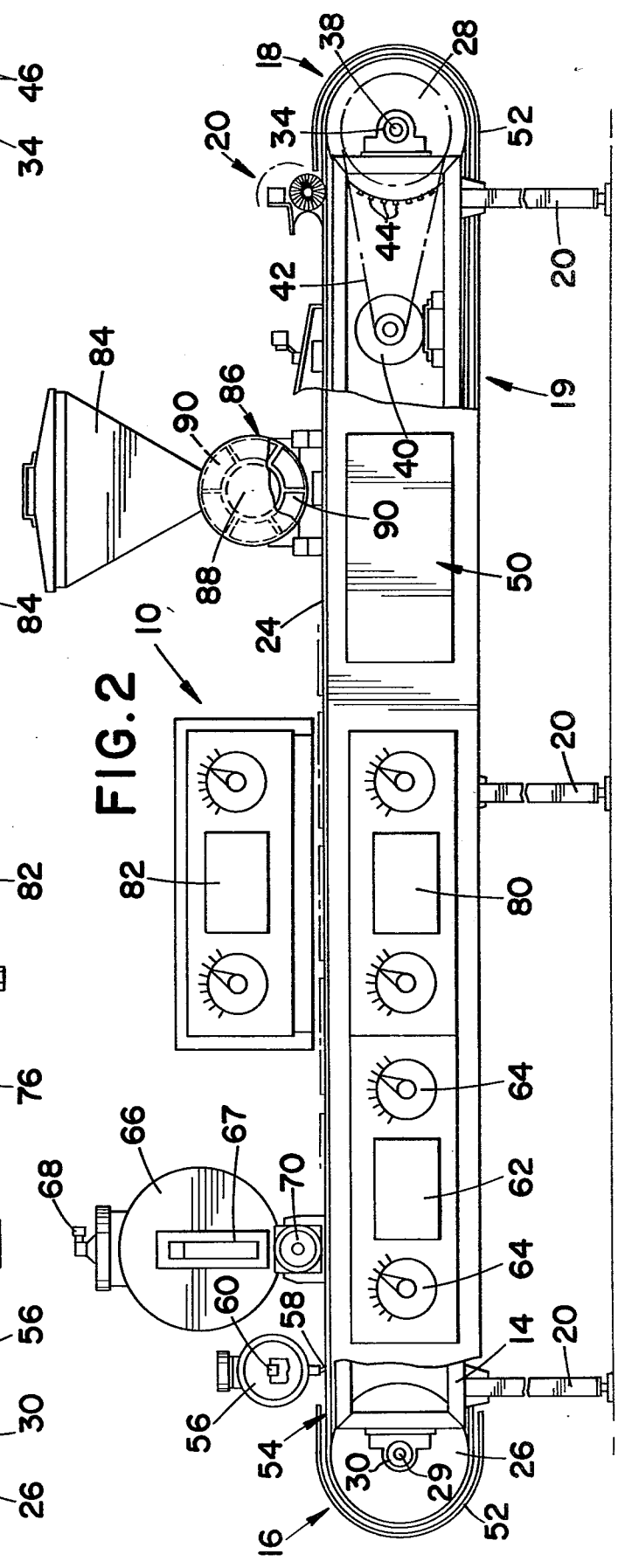

CREPE MAKER

BACKGROUND OF THE INVENTION

This invention pertains to the art of apparatus for the automatic preparation of a food product.

The invention is particularly applicable to the preparation of a crepe food product. However, it will be appreciated to those skilled in the art that the invention could be readily adapted for use in other environments, as, for example, where similar apparatus are employed for the production of food products.

Automated production of food products has increased in recent years in response to increasing demand for fast food products and precooked convenience food products which are offered for sale typically in frozen form for final cooking and preparation at home. A particular demand has arisen for specialty foods of these types, such as crepes.

Crepes are made by placing a filler food product, such as meat, rice, fruits, vegetables, seasonings and combinations thereof, onto a cooked dough sheet and folding the dough sheet to encapsulate the filler food material. Crepes can be folded a variety of ways to encapsulate the filler food product. However, a particularly common method is to fold over portions of the opposed sides of the dough sheet material onto the filler food product and then roll the sheet material onto itself to form a cylindrically configured crepe completely encapsulating the filler food product. An alternate method of folding the crepe includes only rolling up the dough sheet material onto itself, thereby leaving opposed sides of the crepe opened to the filler food material. The latter method is particularly common in the preparation of dessert crepe products. After the dough sheet material has been folded, occasionally the crepe will be cooked to further heat the filler food material and to impart a crispy crust texture to the outer surface of the crepe. Due to the wide variety of available filler food materials to be used in making crepes, a crepe's final form will be somewhat dependent upon offering the crepe and its filler food material in a most appetizing form. In addition, nationality type crepes can be offered in which the filler food material is particularly identified with a certain nationality.

In the past, crepes have generally been prepared completely by hand. The hand operation of precooking the dough sheet material, placing the filler food material onto the individual sheets, folding and forming the crepes, deep frying or otherwise finally preparing the crepe and final packaging has been extremely time consuming, economically inefficient, and demanding a high level of individual skill. As the demand for specialty products, such as crepes, has increased, there has also been a demand for fully automatic apparatus for the continuous preparation of crepe products.

Prior automatic food preparation machines utilizing a filler food material encapsulated in an outer layer of dough or crust have heretofore been suggested and employed in the industry, all with varying degrees of success. Typically, such prior automatic food preparation machines have comprised complex conveyor systems utilizing an assortment of dispensing and heating devices in combination with intricate folding devices. It has been found that the defects present in such machines are such that they have limited economic and practical value.

More particularly, the intricate folding devices incorporated in prior assemblies have been so complex as to require frequent maintenance and are particularly difficult to maintain in a sanitary and clean operation.

The present invention contemplates a new and improved arrangement which overcomes all of the above referred to problems and others to provide a new crepe making machine which is simple in design, economical to manufacture, easy to install, easy to service, eliminates hand cooking, filling and folding operations, automatically and continuously produces crepe products of superior quality and uniformity, and eliminates the sanitation and cleanliness problems inherent in hand production and complex folding machinery.

SUMMARY OF THE INVENTION

In accordance with the present invention, there is provided a new and improved crepe making machine particularly suited for use in the automatic production of crepes. The machine itself is generally comprised of a frame supported in a continuous conveyor belt having an oil and batter dispenser at one end, intermediately disposed heating means, a dispenser for apportioning filler food material onto cooked batter, a side folding spade for folding side portions of the cooked batter onto the filler food material, and a rolling mechanism in association with a rolling spade for rolling over the cooked batter sheet and the filler food material onto itself into a cylindrical configuration.

In accordance with another apsect of the present invention, the side folding spades comprise arcuately configured spade side walls tapered from one end to the other end.

According to a further aspect of the invention, the rolling mechanism comprises a motor driven roller having an abrasive surface received in an aperture of an arcuately configured spade.

According to yet another aspect of the invention, the side folding spades and rolling spade are affixed to mounting members slidably received on a support bar.

One benefit of the present invention is the provision of a new and improved apparatus for the automatic preparation of a crepe food product.

Another benefit is in the provision of improved folding and rolling mechanism for handling crepes.

Other benefits and advantages for the subject invention will become apparent to those skilled in the art upon a reading and understanding of this specification.

BRIEF DESCRIPTION OF THE DRAWINGS

The invention may take physical form in certain parts and arrangement of parts, the preferred embodiment of which will be described in detail in the specification and illustrated in the accompanying drawings which form a part hereof and wherein:

FIG. 1 is a top plan view of the crepe making machine formed in accordance with the present invention;

FIG. 2 is a side plan view of the machine shown in FIG. 1;

DETAILED DESCRIPTION OF THE INVENTION

Figure 3:
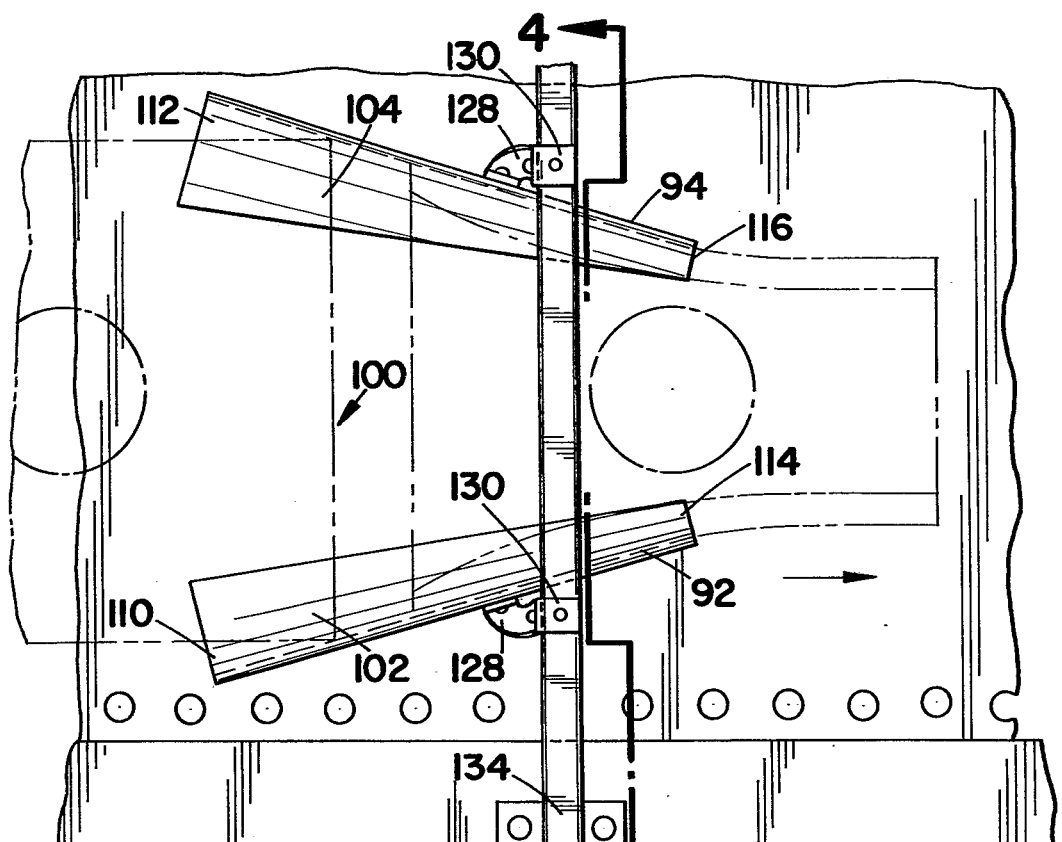
FIG. 3 is a top plan view of a side folding spade used in conjunction with the present invention.

Referring now to the drawings wherein the showings are for purposes of illustrating the preferred embodiment of the invention only and not for purposes of limiting same, FIGS. 1 and 2 show a crepe making machine 10 comprised of a plurality of operatively associated components which cooperate for the automatic production of a crepe.

Crepe making machine 10 is supported by a rigid frame 14 having a first end 16 and a second end 18. Frame 14 is supported by a plurality of identical support legs 20. Legs 20 can be fastened to the floor or to any other surface upon which crepe making machine 10 rests for secure operation of machine 10. Legs 20 are adjustable in length to provide for leveling of machine 10.

Continuous conveyor belt 24 operates to convey crepes along the machine 10 during production. Conveyor belt 24 is preferably constructed of highly polished stainless steel. First support drum 26 at conveyor first end 16 and second support drum 28 at frame second end 18 support conveyor belt 24. Additional support drums, interposed between drums 26, 28, could be utilized as desired. The first support drum 26 is freely mounted to frame 14 by axle 29 at bearings 30, 32 for free rotation of drum 26 and conveyor belt 24 about axle 29. Second support drum 28 is similarly mounted to frame 14 at axle 38 by bearings 34, 36 but is power driven with motor 40 being in operative engagement to drum 28 by belt 42. The second support drum 28 has a plurality of identical, radially-extending teeth 44 on opposed sides. Teeth 44 are received in mating apertures 46 of conveyor belt 24 for positive gear-like traction between conveyor belt 24 and second support drum 28. Motor 40 is mounted to frame 14 and is conventionally controlled in electrical switch and control panel 50. Conveyor belt 24 thus may be continuously rotated about drums 26, 28 in a no-slip belt drive manner. Conveyor belt 24 is enclosed at frame first end 16, frame second end 18 and frame bottom side 19 with enclosure sheet 52. Enclosure sheet 52 serves to protect conveyor belt 24 from dirt and other contamination when the surface of belt 24 is not exposed for automatic food production.

At frame first end 16 a clean conveyor belt surface 54 is exposed for beginning automatic production of crepes. Conveyor belt surface 54 is first oiled with a cooking oil contained in oil container 56. Oil container 56 dispenses oil onto conveyor belt surface 54 through felt wick 58. Felt wick 58 extends transverse of conveyor belt 24 and operates to impart an oil coating to the surface 54. Indicating gauge 60 indicates the amount of oil in the container 56 at any particular time.

After oiling, conveyor belt 24 is next heated from below with first heating griddle 62. First heating griddle 62 may comprise any conventional griddle device but is preferably electrically energized. The amount of heat imparted to conveyor belt 24 is controlled by automatic controls 64. Griddle 62 serves to heat the entire section of conveyor belt 24 passing over it.

After conveyor belt 24 has been heated with first heating griddle 62, batter is then dispensed onto the conveyor belt surface 54. Batter is contained in batter container 66 and the amount contained is indicated by gauge 67. Batter container 66 is air pressurized through nozzle 68 to induce smooth flow of liquid batter onto conveyor belt surface 54. Batter is dispensed through nozzle 70 in a manner to produce paired identical sheets 76 (FIG. 1) of batter. Any conventional valve and nozzle arrangement may be utilized for automatic nozzle 70 but preferably an electrically controlled valve conveying batter to an array of colinear spouts is utilized. In addition, a motor drive mixer 72 is included in batter container 66 to maintain the fluidity of the batter and to facilitate dispensing.

After the batter has been dispensed, it is continued to be heated by first griddle 62 at its undersurface adjacent the belt surface 54. In addition, the batter undersurface is also heated by second heating griddle 80 and the batter uppersurface is heated by third heating griddle 82. First, second and third heating griddles 62, 80, 82 are arrayed so as to impart longer heating time to the bottom surfaces of batter sheets 76. In the production of the crepes, it is necessary that the bottom surface of the batter sheets 76 be cooked for a greater amount of time than the upper surface to obtain the desired consistency and texture of the cooked batter.

When the batter sheets 76 have passed through the heating griddle units, they are in a cooked form and ready for deposition of the filler food material thereon which will ultimately be enclosed therein. The filler food product to be deposited on the cooked batter sheets 76 is contained in fill container 84 and is deposited upon the batter sheets 76 through fill measuring and dispensing mechanism 86.

In the preferred embodiment, a pair of identical fill container and fill measuring and dispensing mechanisms are utilized to impart the filler food product onto spaced sheets 76.

Fill measuring and dispensing mechanism 86 comprises an electrically controlled revolving member 88 having a plurality of radially extending cups 90 for receiving and dispensing the filler food product. Dispensing mechanism 86 is electrically operated and controlled through electrical switch and control panel 50 and, as it is rotated, filler food product falls into cup 90 through an aperture (not shown) in the fill container 84 when the cup 90 is adjacent the fill container. As dispensing mechanism 86 is further rotated, the apportioned amounts of filler food product gravitationally fall onto the batter sheet. In the embodiment shown in FIGS. 1 and 2, the fill measuring and dispensing mechanism 86 would rotate clockwise as the conveyor belt 24 rotates clockwise.

After the filler food product has been dispensed onto the cooked batter sheet 76, the sheet 76 is ready to be folded and rolled to form a completed crepe. A first set of opposed folding spades 92, 94 and a second set of opposed folding spades 96, 98 operate to fold portions of the sides of spaced sheets 76 back onto the sheet and over the filler food product.

Figure 4:
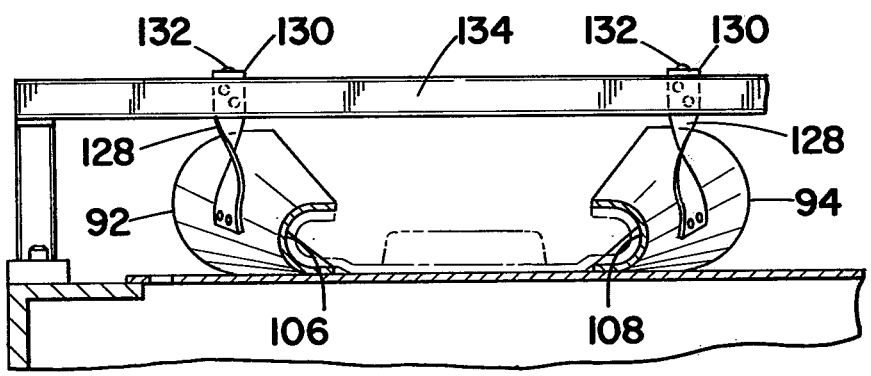
FIG. 4 is a cross-sectional view taken along line 4—4 in FIG. 3.
Figure 5:
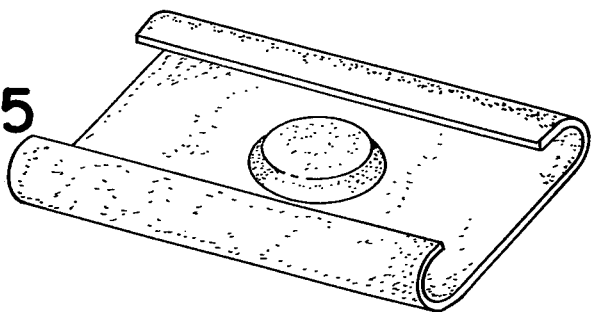
FIG. 5 is a perspective view of a crepe after having passed through a side folding spade.

With particular reference to FIGS. 3 and 4, it may be seen that as the spaced sheet front edge 100 engages the set of folding spades 92, 94 at the front corners 102, 104, the corners are slid up the side walls 106, 108 as the sheet 76 is moved along the spade. The spades 92, 94 side walls are arcuately configured and tapered from their first ends 110, 112 to their second ends 114, 116, respectively. The spade configurations operate to fold only a portion of the batter sheets 76 side edges over onto the filler food product as illustrated in FIG. 5.

Figure 6:
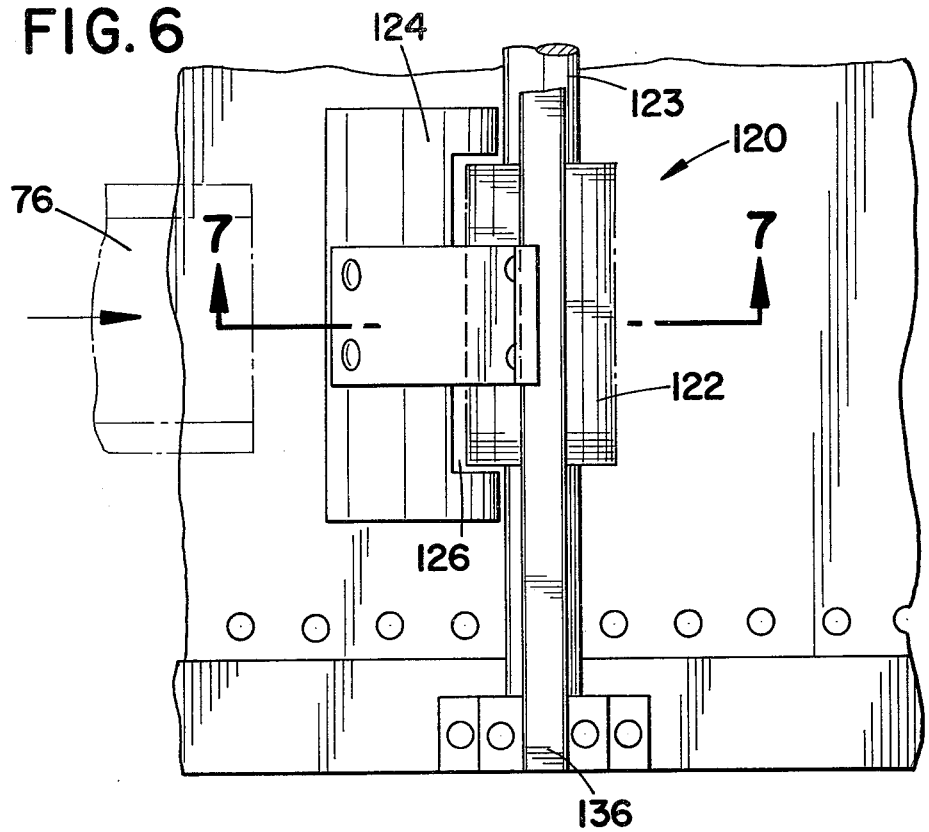
FIG. 6 is a top plan view of the rolling mechanism used in conjunction with the present invention.
Figure 7:
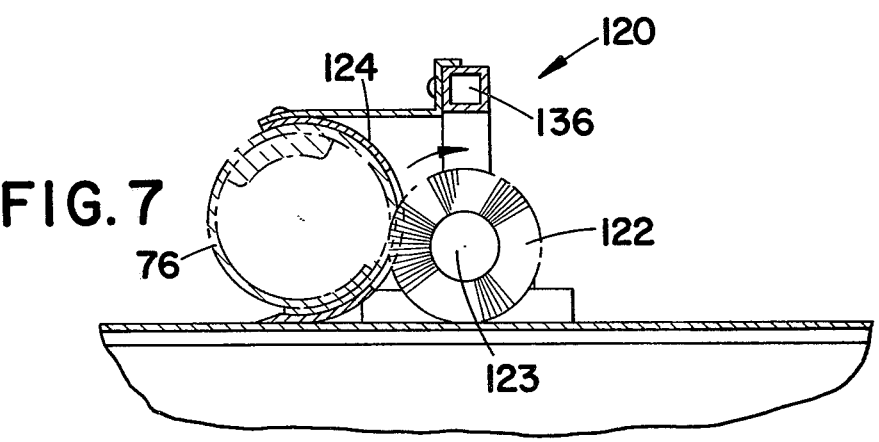
FIG. 7 is a cross-sectional view taken along line 7—7 in FIG. 6.

After folding, the sheet and deposited fill are ready to be rolled into crepe form. As shown in FIGS. 6 and 7 rolling mechanism 120 is comprised of a roller 122 and associated spade 124. Roller 122 is mounted on axle 123 which is motor driven to rotate in a clockwise direction. Roller 122 has an abrasive surface for engaging the sheet 76. As conveyor belt 24 urges the sheet 76 into the rolling mechanism 120, roller 122 pushes the sheet 76 up into associated spade 124 which is arcuately configured to roll the sheet 76 onto itself. Roller 122 is received in an aperture 126 of associated spade 124 and is disposed to engage the undersurface of sheet 76. A rolled crepe is manually removed from the rolling mechanism 120.

Figure 8:
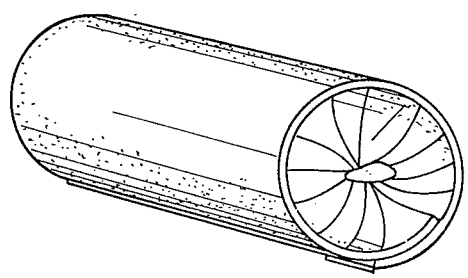
FIG. 8 is a perspective view of a rolled crepe as it is manually removed from the machine.

After rolling, the crepe is in a form (FIG. 8) which is ready for consumption or may be cooked and served or packaged and frozen for later service.

It is a particular feature of the invention that the folding and rolling components of the machine are mounted to the frame in a manner to allow ready removal for cleaning and for modification of the machine method. For example, folding spades 92, 94, 96, 98 are affixably received on identical mounting members 128 (FIGS. 3 and 4). Mounting members 128 have an open ended rectangular socket 130 which is slidably received on transverse support bar 134. A set screw 132 is used to fix mounting member 128 in a certain position on transverse bar 134. Transverse support bar 134 is fixed to frame 14.

Similarly, rolling mechanism spade 124 is secured to rolling mechanism transverse bar 136.

The invention has been described with reference to the preferred embodiment. Obviously, modifications and alterations will occur to others upon the reading and understanding of the specification. It is our intention to include all such modifications and alterations insofar as they come within the scope of the appended claims or the equivalents thereof.

I claim:

1. An apparatus for preparing a food product having at least a cooked batter outer shell and a filling material contained therein comprising:

a frame;

a motor-driven, continuous conveyor belt mounted on said frame;

means for oiling the surface of said belt;

a batter dispenser having a container for holding batter and an associated nozzle for dispensing batter to said surface of said belt;

a first griddle means for first heating at least said belt only;

a second griddle means for heating batter dispensed on said belt;

a filling material dispenser having a hopper for holding filling material and an associated apportionment mechanism for dispensing apportioned amounts of filling material;

a plurality of side-folding spades disposed to said belt to fold over side portions of said batter in conveyance on said belt and having arcuately configured sidewalls, tapered from one end to the other end;

a rolling mechanism comprising a power driven roller in association with a rolling spade disposed to said belt for rolling said batter and filling material contained therein over onto itself; and, control means for controlling the operation of said apparatus.

2. The apparatus as defined in claim 1 wherein said means for oiling said surface of said conveyor belt comprises an oil container with an associated felt wick disposed transverse of said belt.

3. The apparatus as defined in claim 1 wherein said rolling mechanism further comprises an abrasive surface on said roller, said roller at least partially extending through an aperture in said rolling spade.

4. The apparatus as defined in claim 3 wherein said rolling spade is arcuately configured and affixed to a mounting member, said mounting member comprising an open-ended socket slidably received on a support bar, and fastening means for fastening said mounting member to said support bar.

5. The apparatus as defined in claim 1 wherein said plurality of said folding spades are each affixed to a mounting member, said mounting member comprising an open-ended socket slidably received on a support bar, and fastening means for fastening said mounting member to said support bar.

* * * * *